United States Patent
Fay

(10) Patent No.: US 8,110,102 B2
(45) Date of Patent: Feb. 7, 2012

(54) LIQUID FILTER

(75) Inventor: Ronald Fay, Delligsen (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 644 days.

(21) Appl. No.: 12/234,627

(22) Filed: Sep. 20, 2008

(65) Prior Publication Data

US 2009/0101570 A1    Apr. 23, 2009

(30) Foreign Application Priority Data

Sep. 21, 2007    (DE) .................... 20 2007 013 281 U

(51) Int. Cl.
*B01D 35/30* (2006.01)

(52) U.S. Cl. ........ 210/232; 210/440; 210/443; 210/541; 285/137.11; 285/201; 215/308; 215/309

(58) Field of Classification Search .................. 210/232, 210/440, 441, 443, 444, 454, 541; 285/136.1, 285/137.11, 201; 215/308, 309

See application file for complete search history.

(56) References Cited

U.S. PATENT DOCUMENTS

| | | | | |
|---|---|---|---|---|
| 5,486,288 | A * | 1/1996 | Stanford et al. | 210/440 |
| 6,007,711 | A * | 12/1999 | Atwood | 210/440 |
| 6,306,292 | B1 | 10/2001 | Dell et al. | |
| 6,485,643 | B2 * | 11/2002 | Vardion | 210/232 |
| 2002/0162782 | A1 * | 11/2002 | Maxwell | 210/440 |
| 2003/0141235 | A1 * | 7/2003 | Stankowski et al. | 210/232 |
| 2004/0026332 | A1 * | 2/2004 | Mouhebaty et al. | 210/444 |
| 2004/0222145 | A1 * | 11/2004 | Onoue et al. | 210/443 |
| 2005/0178715 | A1 * | 8/2005 | Thomas et al. | 210/440 |
| 2007/0090043 | A1 * | 4/2007 | Matsushita et al. | 210/443 |
| 2007/0108119 | A1 * | 5/2007 | Mandt et al. | 210/443 |

FOREIGN PATENT DOCUMENTS

| | | |
|---|---|---|
| DE | 29519920 U1 | 5/1997 |
| EP | 0537520 A1 | 4/1993 |
| FR | 2864910 A1 | 7/2005 |

* cited by examiner

*Primary Examiner* — Christopher Upton

(74) *Attorney, Agent, or Firm* — Fox Rothschild LLP

(57) ABSTRACT

A liquid filter intended for use as a fuel filter is composed of a housing produced from aluminum by an extrusion process and of a cover (1) formed as an aluminum casting. The cover (1) is provided with connecting bores (4', 5') in which pipe elements (6, 9) which are intended for delivering and discharging fuel are held by means of an adhesive bond. This results in a cover which can be produced more cost-effectively than the prior art and which can further be used as a casting which can be employed in modular fashion, this casting allowing different variations for the connections of the pipe elements.

19 Claims, 2 Drawing Sheets

LIQUID FILTER

BACKGROUND OF THE INVENTION

This application claims priority to German patent application DE 20 2007 013 281.6 filed 21 Sep. 2007 and which is hereby incorporated by reference herein. The invention relates to a liquid filter composed of a metal housing configured to receive a filter medium.

Examples of such liquid filters are fuel filters for diesel engines. These are routinely operated as full-flow filters and are composed of a cylindrical housing, for example made of metal, in which there is received a filter medium through which fuel to be treated flows and which exerts a retaining function on entrained solid particles, which can be considered as impurities, and of a cover releasably connected to one end side of this housing. The housing can additionally be configured with a view to trapping entrained water. The cover is provided in each case with bores which are intended for the connection of pipe elements serving respectively for delivering and discharging fuel.

Fuel filters form a wear part on which increasing demands are placed in view of the fuel purity demanded for modern injection systems, and therefore there is particular interest in a filter which can be produced economically. It is known to produce the housing of such a filter from aluminium or steel using a deep-drawing process and to produce the cover from the same material using a pressing process, in particular extrusion, wherein the possibilities available in principle for producing a connection with the said pipe elements comprise screwing or else soldering, brazing or welding. Such a fuel filter is also known from U.S. Pat. No. 6,306,92 B1, for example.

The production of the cover by extrusion is characterized by a comparatively expensive die and finishing processes and cannot be regarded as ideal for this very reason. The use of soldering or welding techniques to attach the pipe elements can also be considered as expensive, specifically not least because of the associated outlay on energy, apparatus and manual labour. A comparable situation also applies to the said threaded connections in which a considerable production outlay likewise arises as a result.

Against the economic background where liquid filters, in particular fuel filters, can be regarded as mass-produced products and have to be made available in large quantities, the design forms produced using the above-described techniques appear inappropriate with regard to the resultant cost requirement.

FR 2 864 910 A1 discloses a fuel filter which is composed of a housing receiving a filter body and of a cover which can be placed in a sealing manner on a central connecting stub of the housing, in which cover delivery lines, return lines and outlet lines for fuel are integrated. The cover made of plastic is connected via a latching engagement to the housing, likewise made of plastic.

A further variant of a fuel filter is disclosed in EP 0 537 520 A1 and is composed of a cover in whose central opening a connecting plug formed from soft rubber is inserted in a sealing manner, this plug in turn serving to receive pipelines intended for the inflow and the outflow of fuel.

SUMMARY OF THE INVENTION

It is the object of the invention to design a liquid filter of the initially indicated generic type with the proviso that the production costs are lowered in relation to this prior art. This object is achieved in such a liquid filter having a metal housing configured to receive a filter medium arranged for through-flow and of a metal cover closing off this housing on one side. Pipe elements for delivering and discharging liquids are inserted into the structure of the metal cover, wherein the metal cover is a casting made of aluminium and is provided with connecting bores in which pipe elements are held by means of an adhesive bond.

Accordingly, it is essential for the invention that the connection between the said pipe elements and the cover is configured to take the form of an adhesively bonded connection. By contrast with the initially presented prior art, there is hereby achieved a considerably reduced labour effort and energy requirement and—as a consequence thereof—a reduction in the production costs. The cover is a casting of aluminium, with use preferably being made of a vacuum pressure die-casting process. This type of production can be used cost-effectively with an adequately reproducible quality and is therefore optimally tailored to the character of these covers as mass-produced products. The cover can accordingly be an aluminium casting which can be employed in modular fashion and which allows different variations of the connections.

In another embodiment, the pipe elements are formed from aluminium, and therefore, with respect to the cover, an adhesive optimally tailored to this pairing of materials can be used.

In accordance with further features of the invention, the cover is additionally equipped with means for fastening parts of a return line of a liquid supply system, for example of a fuel supply system, wherein a through-going pipe element serving this purpose is in turn made of aluminium for example and is held thereon by means of an adhesive bond. However, other materials for the through-going pipe element are not excluded. For this purpose, the cover can be provided with a half-shell-like recess which is open towards the upper side, with the result that subsequent insertion of the through-going pipe element is made possible.

According to further embodiments of the invention, the cover includes a superstructure which extends on the outer side, bulges out from the base plane thereof and is provided with connecting bores and/or the said half-shell-like recess. Both the recess and the connecting bores are configured as adhesive surfaces to which the through-going pipe element or the pipe elements are secured. Furthermore, these adhesive surfaces can be used as interfaces for attaching elements of the fuel supply system, for example for mounting valves, fuel lines, etc.

Corresponding to the features of yet another embodiment of the invention, the through-going pipe element and/or the pipe elements are additionally arranged so as to be secured axially, at least in one direction, with positive locking in the recess or the connecting bores. This makes it possible to ensure an increased level of mounting reliability. At the same time, a positive-locking connection also makes it possible to constitute an axial limitation of insertion of a pipe element in a connecting bore.

Additional embodiments of the invention are directed towards possible advantageous orientations of the pipe elements and of the through-going pipe element relative to one another and to the cover. For example, the pipe elements and the through-going pipe element can extend parallel to a base plane of the cover, or parallel to one another. However, other orientations also come into consideration.

The liquid filter can be wholly designed as a wear part, and hence replacement part. This means that the cover and the housing are connected to one another with a non-releasable connection and can be welded to one another, for example. However, the connection between the housing and the cover can be of releasable design, in particular be based on a screw connection, with the result that, for example, only the housing and/or the filter medium are designed as a wear part or wear parts.

The liquid filter can have a globally cylindrical shape, with an edge lip being formed along the periphery of the circular cover, this lip extending perpendicularly to the plane of the cover. This edge lip can be the carrier of a thread via which the cover is screwed to the housing—alternatively, however, it can also be the carrier of a weld joint between these parts.

Corresponding to the features of still another embodiment, the pipe elements and/or the through-going pipe element can be formed from the same material as the cover. This opens up the possibility of optimally tailoring the adhesive to the materials used.

BRIEF DESCRIPTION OF THE DRAWINGS

The invention will be explained in more detail below with reference to the exemplary embodiment which is schematically illustrated in the drawings and which describes a liquid filter according to the invention by way of a fuel filter. In the drawings.

DETAILED DESCRIPTION

Figure 1:
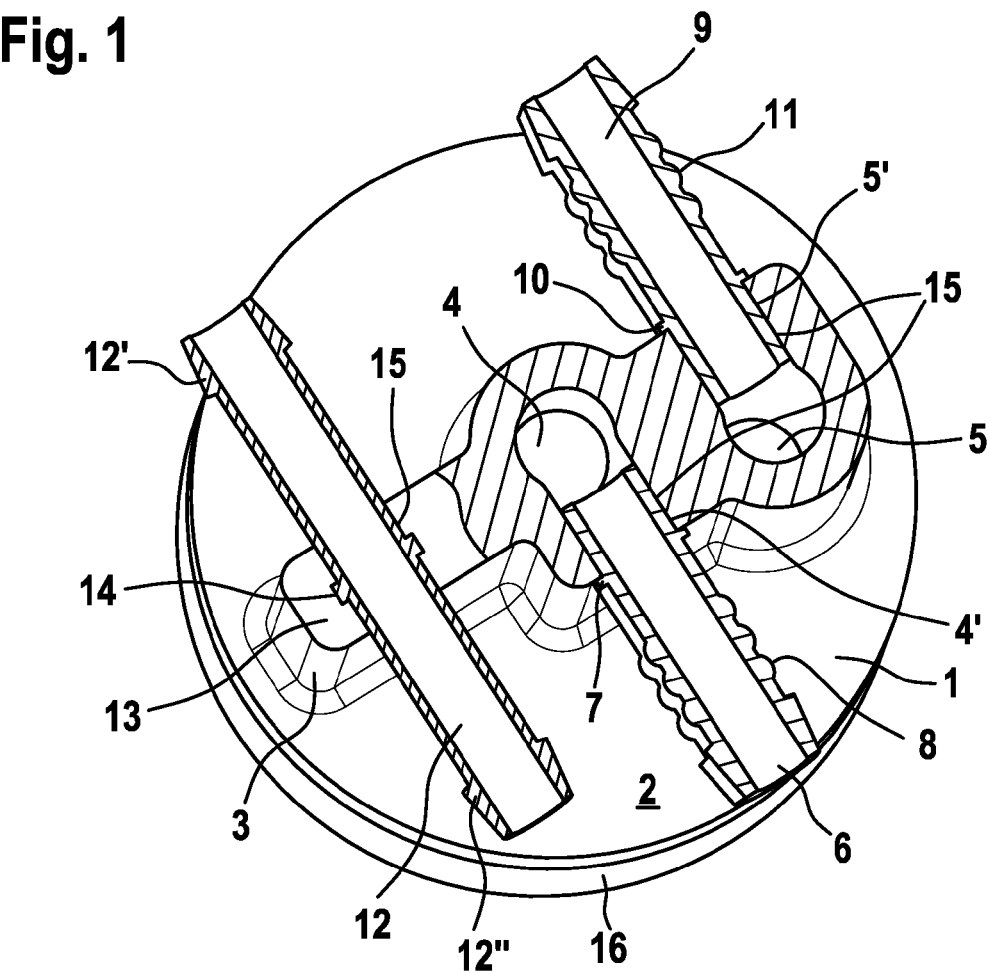
FIG. 1 shows the cover of a fuel filter in an upper-side perspective, partial sectional view.
Figure 2:
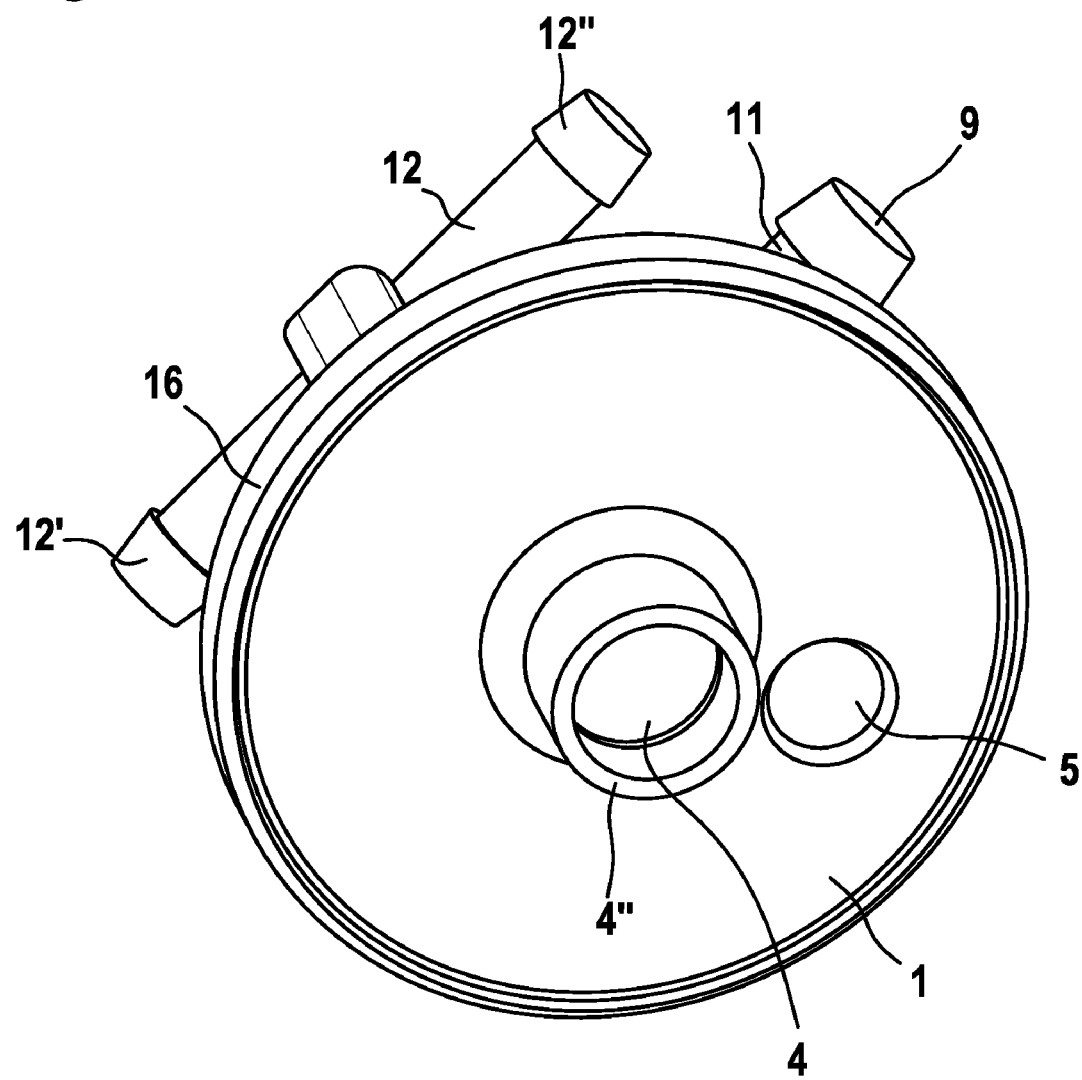
FIG. 2 shows the underside of the cover shown in FIG. 1 in a perspective view.

FIGS. 1 and 2 show a circular cover 1 in a partial sectional representation in a plane parallel to the end side of the housing, this cover being intended for the housing (not illustrated in the drawing) of a diesel fuel filter.

Extending on the upper side from the base plane 2 of the cover 1 that is oriented perpendicularly to the axis of the globally cylindrical housing is a superstructure 3 which has, in a central region, an outlet bore 4 running coaxially with respect to the axis of the housing and, in an edge region, an inlet bore 5 running parallel to the outlet bore. The two bores 4, 5 are continued in elbows within the superstructure 3 and terminate in respective connecting bores 4', 5' extending parallel to one another and to the base plane 2. On the underside with respect to the cover 1, the outlet bore 4 is continued in a pipe stop 4".

Reference number 6 is used to designate a pipe element produced from aluminium which is plugged into the connecting bore 4' as far as a stop flange 7 and which is provided on the outer side of its projecting end with an annular profiling 8 intended for producing a positive-locking connection with a hose line.

Reference number 9 is used to designate a pipe element made of aluminium which is plugged into the connecting bore 5' as far as a stop flange 10 and which is provided on the outer side of its projecting end with an annular profiling 11 intended for producing a positive-locking connection with a hose line. Instead of the graphically represented fluted connection geometry of the pipe element, it is also possible to use other forms, for example those according to SAE J 2044.

Reference number 12 is used to designate a through-going pipe element which is inserted into a half-shell-like recess 13 open towards the upper side of the cover 1 and which is secured with positive locking therein in the axial direction by means of an approximately centrally arranged annular flange 14. This through-going pipe element 12 is made of aluminium in the same way as the pipe elements 6, 9 and provided at both free ends with annular profilings 12', 12" or the like.

The through-going pipe element 12 forms part of the fuel return line and is not associated with the actual filtering operation.

By means of the pipe elements 6, 9 and the through-going pipe element 12, the fuel filter shown can be integrated in a conventional manner into the fuel supply system of a diesel engine.

The housing is equipped in a conventional manner at least with a filter medium suitable for use with diesel fuel. It is made of aluminium and can be produced using an extrusion process.

The cover 1 is, according to the invention, an aluminium casting and preferably produced using a vacuum pressure die-casting process.

The entire structural unit consisting of the housing and the cover 1 can be designed as a uniform structural element. In this case, the housing is welded to the cover 1, with use preferably being made of laser welding. However, consideration can also be given to designing only the housing including the filter medium or else only the latter as a replacement part. In this case, the cover 1 can be screwed to the housing.

The cover 1 is provided in each case with a cylindrical edge lip 16 which is configured as a peripheral attachment surface for the housing, whether by screwing or by welding.

It is essential for the invention that the pipe elements 6, 9 and also the through-going pipe element 12 are adhesively bonded, at the points 15, in a two-dimensional manner with the mutually facing inner sides of the connecting bores 4', 5' and of the recess 13, these inner sides each forming adhesive surfaces and being correspondingly machined, so as to result in a permanent and in particular reliable connection between these pipe elements and the cover 1.

It will be recognized that a cover designed in such a way constitutes a structural part which can be produced extremely efficiently and which can effectively meet the initially presented demand for lowering the production costs of these mass-produced products.

However, the application of the invention is not restricted to fuel filters. It can be used in principle with any liquid filters having a structurally similar design.

What is claimed is:

1. Liquid filter composed of a metal housing configured to receive a filter medium arranged for through-flow and of a metal cover closing off this housing on one side, wherein at least pipe elements for delivering and discharging liquids are inserted into the structure of the metal cover, wherein the metal cover is a casting made of aluminium and is provided with connecting bores in which pipe elements are held by means of an adhesive bond.

2. Liquid filter according to claim 1 wherein the pipe elements are made of aluminium.

3. Liquid filter according to claim 2 wherein the cover is additionally equipped with means for fastening a through-going pipe element forming a part of a return line of a liquid supply system.

4. Liquid filter according to claim 2 wherein the cover is provided on the upper side with a superstructure projecting from the base plane of the cover, the superstructure being provided with connecting bores forming adhesive surfaces on the inner side.

5. Liquid filter according to claim 2 wherein the pipe elements extend parallel to a base plane of the cover.

6. Liquid filter according to claim 1 wherein the cover is additionally equipped with means for fastening a through-going pipe element forming a part of a return line of a liquid supply system.

7. Liquid filter according to claim 6, wherein the through-going pipe element is made of aluminium.

8. Liquid filter according to claim 7 wherein the mounting positions of the pipe elements and/or of the through-going pipe element is additionally secured with positive locking at least in one direction.

9. Liquid filter according to claim 7 wherein the through-going pipe element extends parallel to a base plane of the cover.

10. Liquid filter according to claim 6 wherein the said means are constituted by a half-shell-like recess which is open towards the outer side or upper side and which is intended for receiving, securing and positioning the through-going pipe element.

11. Liquid filter according to claim 10 wherein the through-going pipe element is held in the recess by means of an adhesive bond.

12. Liquid filter according to claim 11 wherein the cover is provided on the upper side with a superstructure projecting from the base plane of the cover, and in that the recess is formed into the superstructure on the outer side and forms an adhesive surface on the inner side.

13. Liquid filter according to claim 10 wherein the cover is provided on the upper side with a superstructure projecting from the base plane of the cover, and in that the recess is formed into the superstructure on the outer side and forms an adhesive surface on the inner side.

14. Liquid filter according to claim 6 wherein the mounting positions of the pipe elements and/or of the through-going pipe element is additionally secured with positive locking at least in one direction.

15. Liquid filter according to claim 6 wherein the through-going pipe element extends parallel to a base plane of the cover.

16. Liquid filter according to claim 6 wherein the pipe elements and the through-going pipe element extend parallel to one another.

17. Liquid filter according to claim 6 wherein at least one of the pipe elements and/or the through-going pipe element is/are formed from the same material as the cover.

18. Liquid filter according to claim 1 wherein the cover is provided on the upper side with a superstructure projecting from the base plane of the cover, the superstructure being provided with connecting bores forming adhesive surfaces on the inner side.

19. Liquid filter according to claim 1 wherein the pipe elements extend parallel to a base plane of the cover.

* * * * *